United States Patent [19]
Shimosaka et al.

[11] Patent Number: 5,975,869
[45] Date of Patent: Nov. 2, 1999

[54] GOLF BALL MOLD HAVING ADJUSTABLE PIMPLE FORMING PINS

[75] Inventors: Hirotaka Shimosaka; Keisuke Ihara; Yutaka Masutani; Michio Inoue; Atuki Kasasima, all of Chichibu, Japan

[73] Assignee: Bridgestone Sports Co., Ltd., Tokyo, Japan

[21] Appl. No.: 08/931,835

[22] Filed: Sep. 17, 1997

[30] Foreign Application Priority Data

Sep. 19, 1996 [JP] Japan ................................. 8-269218

[51] Int. Cl.⁶ ........................... B29C 45/14; B29C 45/26
[52] U.S. Cl. ......................... 425/116; 249/155; 425/577
[58] Field of Search ................................. 425/116, 577, 425/195, 468; 249/155

[56] References Cited

U.S. PATENT DOCUMENTS

| | | | |
|---|---|---|---|
| 2,361,348 | 10/1944 | Dickson et al. | 425/116 |
| 3,068,522 | 12/1962 | Nickerson et al. | 425/116 |
| 3,136,001 | 6/1964 | Gelbard | 249/155 |
| 4,047,692 | 9/1977 | Swin, Sr. | 249/155 |
| 4,342,549 | 8/1982 | Lemelson | 425/468 |
| 4,959,000 | 9/1990 | Giza | 425/116 |
| 5,122,046 | 6/1992 | Lavallee et al. | 425/116 |
| 5,147,657 | 9/1992 | Giza | 425/117 |
| 5,387,096 | 2/1995 | Weiser | 425/577 |
| 5,407,341 | 4/1995 | Endo et al. | 425/116 |
| 5,458,473 | 10/1995 | Banji | 425/116 |
| 5,688,193 | 11/1997 | Kasasima et al. | 425/542 |
| 5,759,116 | 6/1998 | Kasasima et al. | 425/90 |

FOREIGN PATENT DOCUMENTS

| | | | |
|---|---|---|---|
| 61-173907 | 8/1986 | Japan | 425/116 |
| 6-143349 | 5/1994 | Japan | 425/116 |

*Primary Examiner*—Robert Davis
*Attorney, Agent, or Firm*—Sughrue, Mion, Zinn, Macpeak & Seas, PLLC

[57] ABSTRACT

A golf ball mold includes a pair of split mold sections which are removably mated to define a spherical cavity. The cavity surfaces are provided with a plurality of dimple-forming protrusions. Some of the dimple-forming protrusions are constructed by dimple-forming pins whose inner end has substantially the same shape as the protrusions. The dimple-forming pins are axially or radially movable so that the projection distance of the pins into the cavity is adjustable. With a single mold, golf balls having dimples of different shapes can be produced. Golf balls of quality including symmetry and flight performance can be manufactured at low cost.

6 Claims, 8 Drawing Sheets

GOLF BALL MOLD HAVING ADJUSTABLE PIMPLE FORMING PINS

BACKGROUND OF THE INVENTION

1. Field of the Invention

This invention relates to a mold for the manufacture of golf balls. More particularly, it relates to a mold capable of manufacturing golf balls featuring improved flight performance, symmetry and cost performance.

2. Prior Art

For golf balls, it is desired that dimples be equally distributed on the spherical surface so that the ball may exhibit equal flight performance independent of points of a contact for a shot. That is, golf balls which are improved not only in flight performance, but also in symmetry are required. The requirement now becomes more outstanding as the golf game becomes more popular to the public, the golfer population increases, and the demand of golfers is diversified.

On the other hand, to supply high performance, high quality golf balls at a reasonable price, it is necessary to increase the cost performance of golf balls, that is, to reduce the expense invested in the development of golf balls.

Various attempts have been made to develop a high performance, high quality, low price golf ball meeting the demand of consumers.

For example, optimizing the dimple arrangement and dimple shape (including diameter, depth, and cross-sectional shape) leads to an improvement in symmetry and hence, an improvement in flight performance. Attempts have been made to improve the dimple arrangement and shape.

With respect to the arrangement of dimples on a golf ball, various dimple arrangement designs including icosahedral and dodecahedral arrangements have been proposed. Since the mold for use in the manufacture of golf balls typically consists of at least two split mold sections, golf balls regardless of the dimple arrangement generally have at least one great circle which corresponds to the parting line of the mold and which does not intersect with the dimples.

More particularly, golf balls are manufactured using a mold including a pair of mold sections which are removably mated to define a spherical cavity therein. Since the mold sections themselves are molded and processed in an axi-symmetric manner, the mold cavity and hence, golf ball tends to possess a higher sphericity or roundness about the pole axis corresponding to a line connecting the apexes of the mold section cavities and inversely, a lower sphericity or roundness about an axis extending in the plane circumscribed by the seam line corresponding to the parting line of the mold. Due to this difference in roundness, conventional golf balls can differ in flight performance depending on the position at which the ball is hit. Such flight performance variation raises a serious problem in the golf game wherein the Rules of Golf prescribes that "the ball shall be played as it lies, except as otherwise provided in the Rules."

Figure 9A:
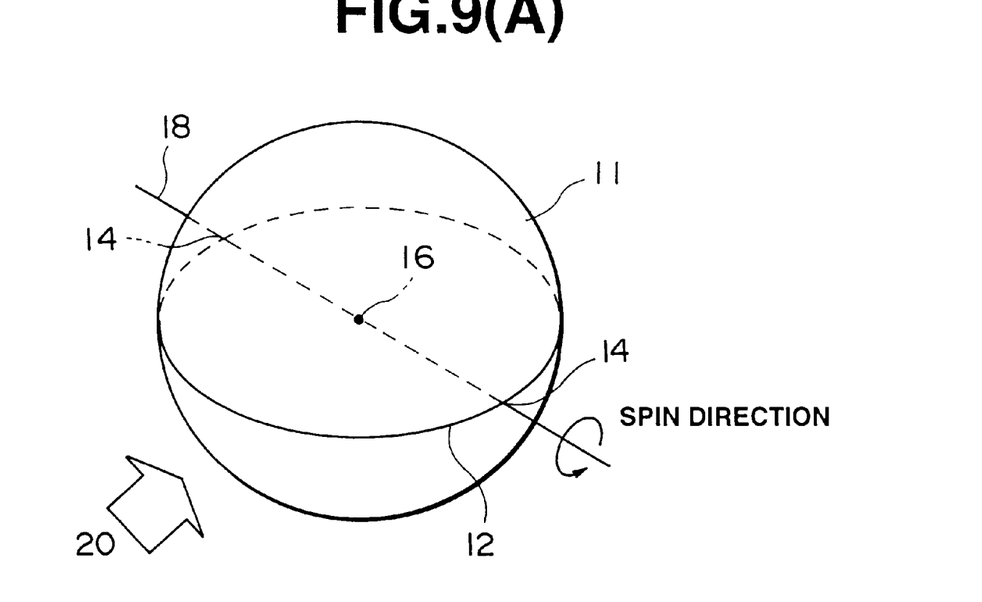
FIGS. 9(A) and 9(B) illustrate the direction in which a golf ball is hit by a club, FIG. 9(A) corresponding to pole hitting and FIG. 9(B) corresponding to seam hitting.
Figure 9B:
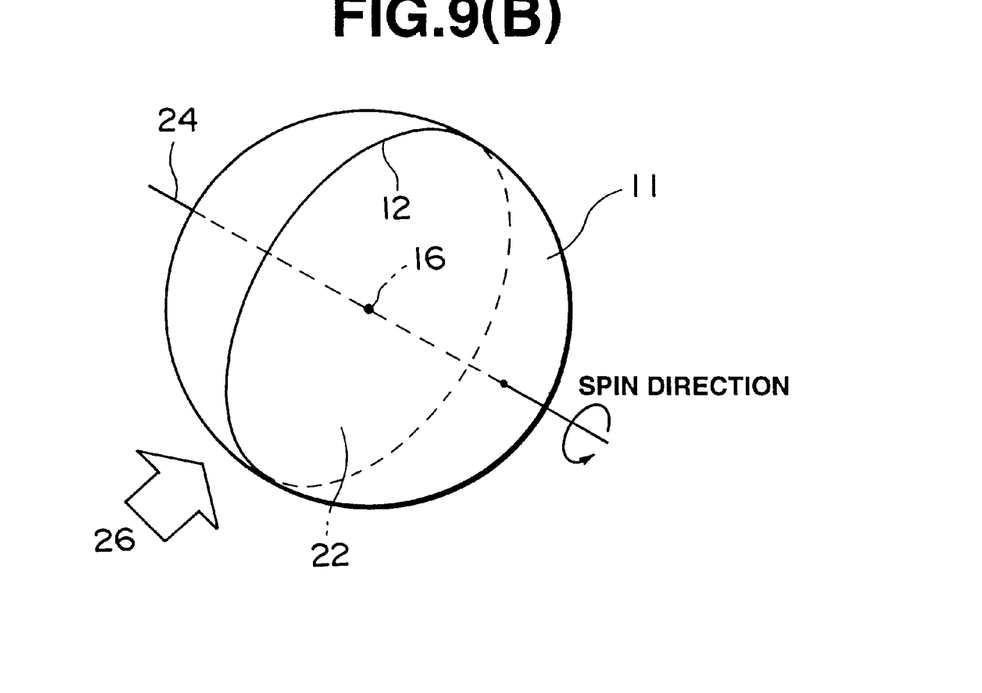

More specifically, when a golf ball is hit by a club, the ball is given back spin although the number of revolutions varies with a particular type of club. Ball hitting is generally classified into pole hitting and seam hitting depending on an impact point. Reference is now made to FIG. 9(A) and 9(B) wherein a golf ball 11 has a seam line 12 and a center 16. The pole hitting means that the ball 11 is hit in the direction of an arrow 20 so as to give back spin about a straight line 18 connecting two diametrically opposed points 14, 14 on the seam line 12 and the center 16 as shown in FIG. 9(A). The seam hitting means that the ball 11 is hit in the direction of an arrow 26 so as to give back spin about a straight line 24 extending perpendicular to a circular plane 22 circumscribed by the seam line 12 and passing the center 16. As previously mentioned, in the event of pole hitting shown in FIG. 9(A), the ball is susceptible to extra lift or drag since it does not define a true circle about the spin axis 18. On the other hand, in the event of seam hitting shown in FIG. 9(B), the ball is substantially free of extra lift or drag since it is close to a true circle about the spin axis 24. As a consequence, if the ball is simply designed such that the effect of dimples may be equal between pole hitting and seam hitting, the effect of dimples would be greater on pole hitting because of a deviation from roundness. Then on pole hitting, the golf ball receives extra lift or drag, exhibiting different flight performance than on seam hitting. This means that the flight performance varies with a particular hit position.

Since the golf ball is a unique spherical body deviating little from the complete sphericity as mentioned above, equal dimple effect is not accomplished by uniformly distributing dimples of equal shape on the ball surface, but by additionally finely adjusting the shape of dimples in accordance with a location on the ball surface. It is important to finely adjust the shape of dimples in proximity to the parting line and poles of the ball.

However, the fine adjustment of the dimple shape is established as a result of a trial-and-error procedure involving making a mold for each of candidate dimple shapes, molding a golf ball in the mold, examining the golf ball for flight performance, symmetry or the like, and repeating the steps for all the candidate dimple shapes. This procedure gives rise to the problems that the development period of a golf ball is prolonged and the development cost is increased.

The development of a golf ball generally involves determining an optimum dimple arrangement and finely adjusting or optimizing the dimple shape, especially dimple depth. With a single mold, only a golf ball having a particular dimple shape can be produced. In order to make an adjustment on the dimple shape, a mold corresponding to a new dimple shape is made again, a ball is molded in the mold, and the ball is tested for performance. In this way, a golf ball of a new dimple design is developed by repeating a series of steps of mold making→testing→adjustment→mold making. Cumbersome steps are necessary, the development period is prolonged, the development cost is increased, and hence, the price of a product is increased. With the above-mentioned development procedure, it is virtually difficult to test a number of dimple shapes.

SUMMARY OF THE INVENTION

An object of the invention is to provide a mold capable of manufacturing golf balls featuring improved flight performance, symmetry and cost performance.

According to the invention, there is provided a golf ball mold comprising a pair of split mold sections which are removably mated to define a spherical cavity between their inner surfaces, the cavity surfaces being provided with a plurality of dimple-forming protrusions, wherein some of the plurality of dimple-forming protrusions are constructed by dimple-forming pins whose inner end has substantially the same shape as the protrusions, and the dimple-forming pins are movable along their axis so that the projection distance of the pins into the cavity is adjustable.

Preferably, the dimple-forming pins are axially movable a distance of at least 0.005 mm. The dimple-forming pins are disposed at the parting surface between the mold sections and in proximity to the opposed poles of the mold sections. The number of dimple-forming pins in both the mold sections is within 60.

Also contemplated herein is a golf ball molded using the mold defined above and featuring improved flight performance, symmetry and cost performance.

The invention is innovative over the prior art development procedure of developing a golf ball of new dimple design involving making a mold whenever a dimple shape is altered, molding a ball in the mold, testing the ball for flight performance and symmetry, and repeating the steps until an optimum result is obtained, and thus requiring cumbersome steps, a prolonged development time, and an increased development expense.

In order to produce golf balls of high performance at a low cost, according to the invention, a golf ball mold is constructed by a pair of split mold sections which are removably mated to define a spherical cavity between their inner surfaces, the cavity surfaces being provided with a plurality of dimple-forming protrusions. Some of the plurality of dimple-forming protrusions are constructed by dimple-forming pins. Each pin has an axis aligned with a radial line from the center of the spherical cavity and a radially inner end of substantially the same shape as the protrusions. The dimple-forming pins are axially movable so that the projection distance of the pins into the cavity is adjustable. Since many different dimple shapes can be tested with a common mold, the invention eliminates a need to make a new mold whenever a dimple shape is altered. Cumbersome steps are no longer needed, the development period is shortened, and the development cost is reduced.

The golf balls molded using the mold of the invention have an optimum dimple shape and arrangement so that the dimple effect is drastically improved. The golf balls are not only of quality in that they are improved in flight performance and symmetry, but are also improved in cost performance so that they may be supplied to the customers at a low price, meeting the demand of the customers.

DESCRIPTION OF THE PREFERRED EMBODIMENT

Referring to FIGS. 1(a) to 4, one embodiment of the invention is described.

FIGS. 1(a), 1(b), 2(a) and 2(b) are schematic cross-sectional views of a mold according to one embodiment of the invention. The mold includes a lower section and an upper section. Since the lower and upper mold sections are identical in a substantial sense, only the lower mold section 1a is shown in FIGS. 1(a), 1(b), 2(a) and 2(b). The lower and upper mold sections are removably mated along a parting surface or line P to define a spherical cavity therein.

Figure 1A:
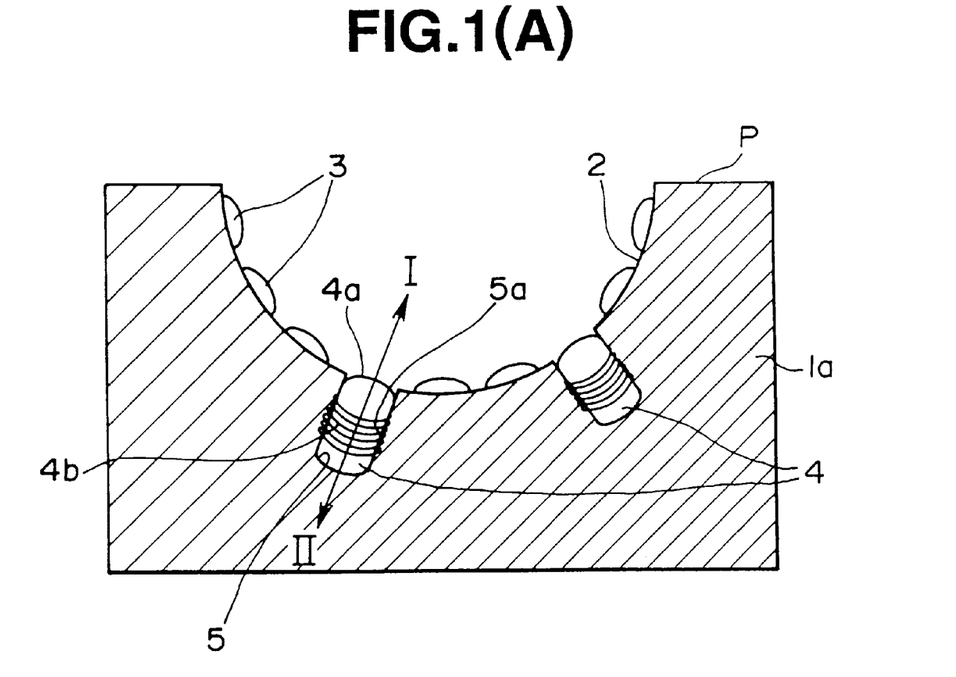
FIGS. 1(a) and 1(b) are schematic cross-sectional views of a lower section of a mold according to one embodiment of the invention, FIG. 1(A) showing dimple-forming pins projected a minimum distance and FIG. 1(B) showing dimple-forming pins projected a maximum distance.
Figure 1B:
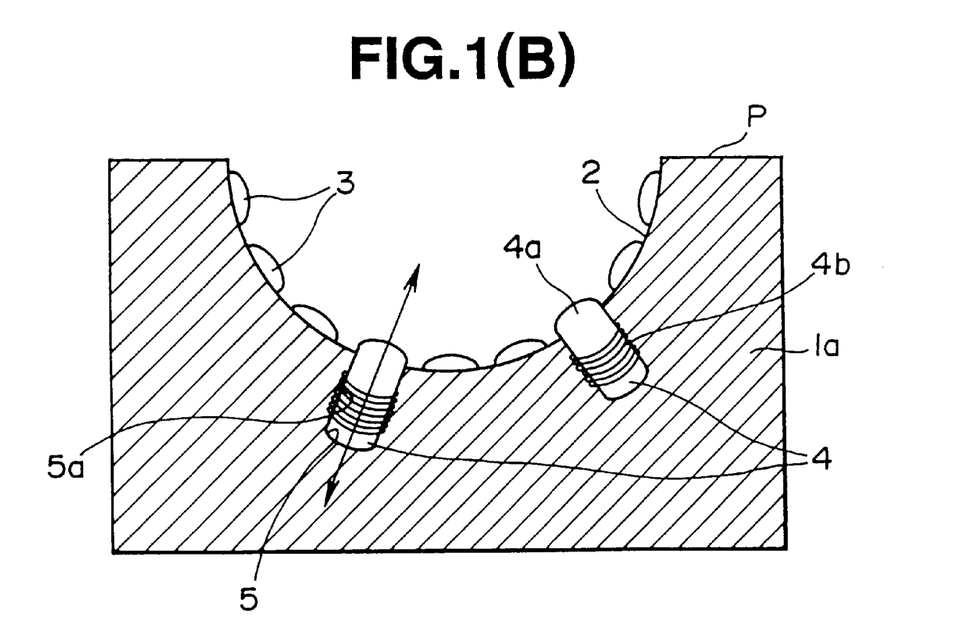

The lower mold section 1a has a hemispherical inner or cavity surface 2 which is provided with a plurality of dimple-forming protrusions 3. Dimple-forming pins 4 are disposed in the cavity surface 2 in proximity to the pole of the mold section and extended in a radial direction with respect to the center of the spherical cavity. Each dimple-forming pin 4 has a radially inner round end 4a configured to substantially the same shape as the protrusions 3. It is noted that where two or more types of dimple-forming protrusions 3 are present, the inner end shape of the dimple-forming pins 4 may be the same as a proper one selected from the two or more types of dimple-forming protrusions 3, and that a plurality of dimple-forming protrusions 3 may have the same or different inner end shapes. Each dimple-forming pin 4 having an axis is provided on an aft outer periphery with an external thread portion 4b. The cavity surface 2 of the lower mold section 1a is provided with pin adjusting bores 5 at positions where the pins 4 are to be disposed. The bore 5 is provided with an internal thread portion 5a in thread engagement with the external thread portion 4b of the pin 4.

The dimple-forming pin 4 is mounted to the lower mold section 1a by engaging its external thread portion 4b with the internal thread portion 5a of the bore 5. By selecting the insertion distance of the pin 4 into the bore 5, the projection distance of the pin 4 beyond the cavity surface 2 can be adjusted. Then, with a single mold, the projection distance of the pins, that is, the depth of dimples can be adjusted as desired. The projection distance of the pins or the depth of dimples is usually 0.04 to 0.3 mm, preferably 0.12 to 0.24 mm and the diameter of the pins or the diameter of dimples is usually 2.0 to 4.6 mm, preferably 3.2 to 4.2 mm.

FIG. 1(A) shows the state wherein the dimple-forming pins 4 are projected a minimum distance and FIG. 1(B) shows the state wherein the dimple-forming pins 4 are projected a maximum distance.

The positions where the dimple-forming pins 4 are disposed are not critical although the pins 4 are preferably disposed in the cavity surface 2 in proximity to the pole of the mold section. The number of dimple-forming pins 4 in both the upper and lower mold sections is preferably 2 to 50, especially 6 to 12. It is understood that all the dimple-forming pins 4 are not depicted in FIGS. 1(a) and 1(b) and only some (two in FIGS. 1(a) and 1(b)) pins are depicted.

The adjustment range of the projection and retraction distance of the pin (dimple depth) is not specifically limited since it varies depending on various factors such as the position of the pin and the sphericity of the ball. Typically, the adjustment range is −0.05 mm to 0.1 mm, preferably −0.02 mm to 0.03 mm. It is understood that a projection distance of −0.05 mm means that the pin inner end (negative dimple) is retracted 0.05 mm from the reference position. Within this range, the pin projection distance is preferably adjusted by projecting or retracting the pin a minimum adjustment quantity of at least 0.005 mm, especially 0.005 to 0.02 mm. If the adjustment range of the pin projection distance (dimple depth) is more than 0.1 mm, the dimple shape would be changed too much so that the ball might look strange in outer appearance even when dimple finishing and surface painting treatments are taken into account. A minimum adjustment quantity of less than 0.005 mm would be insufficient for the adjustment of the dimple depth according to the invention to be significant.

After the projection distance of the dimple-forming pins 4 is adjusted, the pins are preferably secured with an adhesive such as a commercially available vinyl acetate bolt-retaining adhesive in order to prevent the projection distance from being changed by accidental rotation during molding. This adhesive bond is temporary. The dimple-forming pins can be released by removing the adhesive with a solvent. In this way, the projection distance of the dimple-forming pins 4 can be repeatedly adjusted.

Figure 2A:
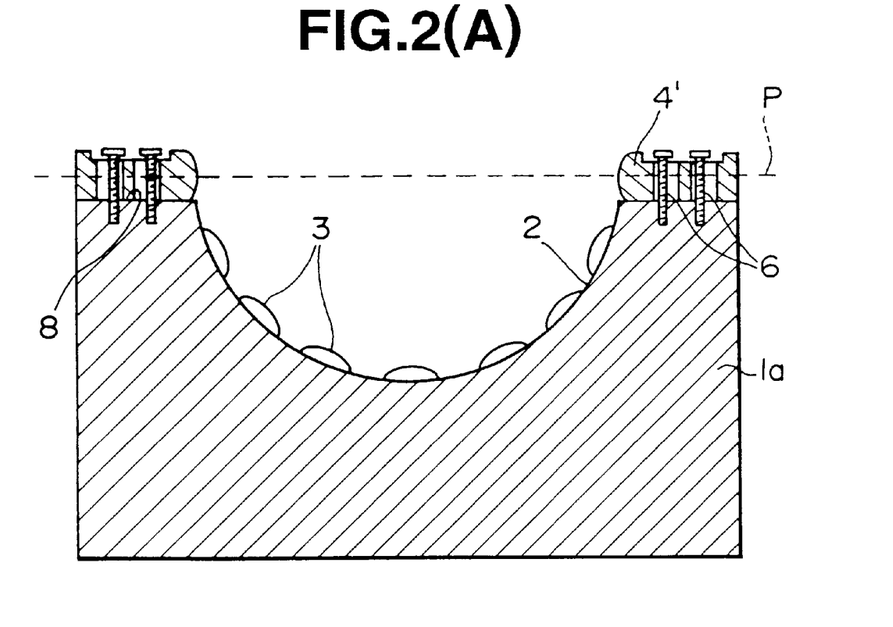
FIGS. 2(a) and 2(b) are schematic cross-sectional views of the lower mold section of FIGS. 1(a) and 1(b) wherein dimple-forming pins are disposed on the parting surface, FIG. 2(A) showing dimple-forming pins projected a minimum distance and FIG. 2(B) showing dimple-forming pins projected a maximum distance.
Figure 2B:
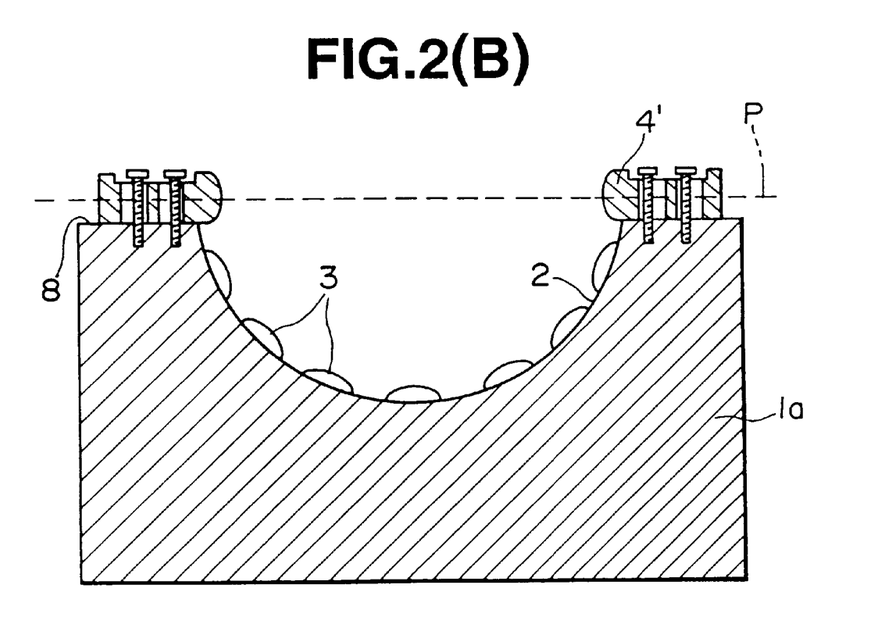
Figure 3:
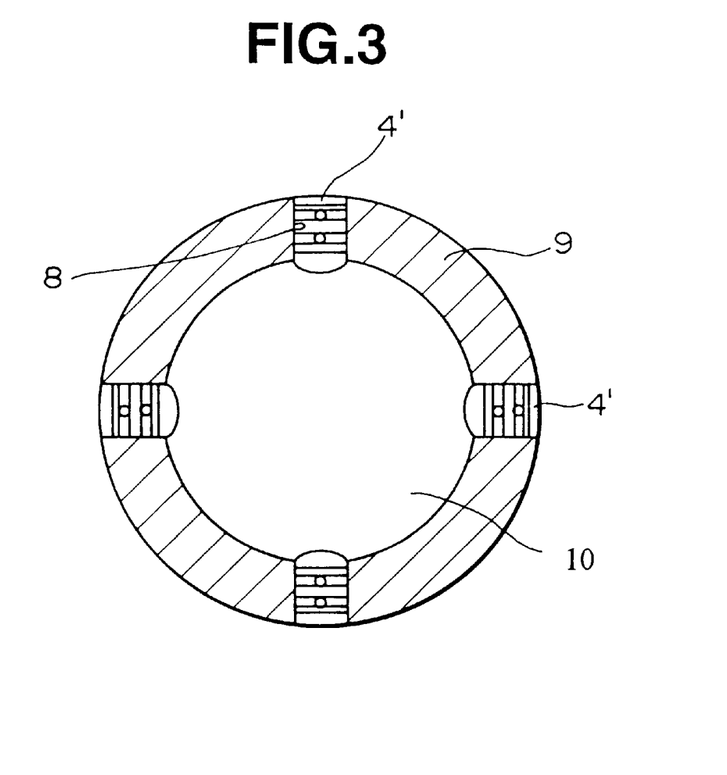
FIG. 3 is a horizontal cross-sectional view of the lower mold section of FIGS. 2(a) and 2(b).
Figure 4:
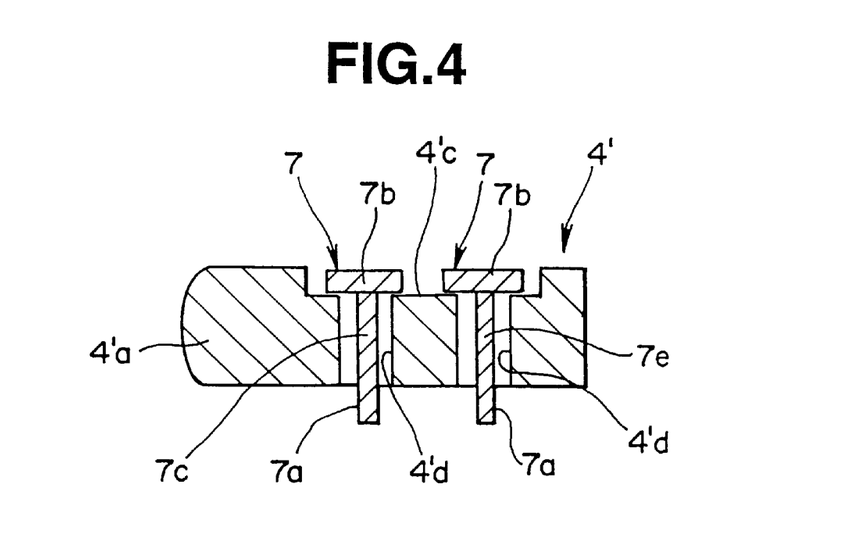
FIG. 4 is an enlarged view of the dimple-forming pin disposed on the parting surface.

In addition to the dimple-forming pins 4 shown in FIG. 1, the mold of the invention further includes dimple-forming pins 4' received in grooves 8 formed in the parting surface P of the lower mold section as shown in FIGS. 2(*a*) and 2(*b*). FIG. 2(A) shows the state in which the dimple-forming pins 4' are projected a minimum distance and FIG. 2(B) shows the state in which the dimple-forming pins 4' are projected a maximum distance. It is preferred to dispose the dimple-forming pins 4' at diametrically opposed positions along the cavity periphery 9 of the parting surface P as shown in FIG. 3. It is noted that the dimple-forming protrusions 3 other than the pins 4' are not shown in FIG. 3. Numeral 10 designates a cavity. The number of dimple-forming pins 4' is usually 3 to 40, preferably 8 to 18.

The dimple-forming pins 4' are disposed in the parting line or surface P between the upper and lower mold sections and extended in a radial direction with respect to the center of the spherical cavity. The structure of the pin 4' is described with reference to FIG. 4. The pin 4' has an axis and a rounded inner end 4'*a* configured to the same shape as the dimple-forming protrusion 3. The pin 4' is provided in the peripheral surface with a recess 4'*c* and two bores 4'*d* and 4'*d* extending perpendicular to the axis and opening in the recess 4'*c*. Screws 7 are inserted through the bores 4'*d*. Each screw 7 has an external threaded distal portion 7*a*, a flat head 7*b* and a stem 7*c*. The pin 4' is secured in place by fastening the screws 7 so as to engage the external threaded distal portions 7*a* with internal thread holes (not shown) in the lower mold section 1*a* until the heads 7*b* are abutted against the recess 4'*c*. The bores 4'*d* are formed to a larger diameter than the outer diameter of the stems 7*c* to leave a clearance for the screws 7. Before the pin 4' is secured by tightly fastening the screws 7 until the heads 7*b* are abutted against the recess 4'*c*, the pin 4' is axially movable within the clearance of the bores 4'*d*. Accordingly, the pin 4' is moved forward or backward to project the rounded inner end 4'*a* a predetermined distance before it is fixedly secured as mentioned above. The pin 4' is at the maximum projection position when the screws 7 abut against the rear wall of the bores 4'*d* as shown in FIG. 2(B). The pin 4' is at the minimum projection position or maximum retraction position when the screws 7 abut against the front wall of the bores 4'*d* as shown in FIG. 2(A). Note that the heads 7*b* of the screws 7 do not protrude beyond the confine of the recess 4'*c*, allowing close junction between the upper and lower mold sections. Although two bores 4'*d* are provided in the illustrated embodiment, only one bore is acceptable.

By disposing the dimple-forming pins 4' on the parting line, there can be produced a golf ball free of a great circle which does not intersect with dimples.

In the golf ball mold according to the invention, adjustable dimple-forming pins are disposed at the parting surface and in proximity to the opposed poles of the mold. The number of adjustable dimple-forming pins in both the upper and lower mold sections is preferably 5 to 60, especially 10 to 30. If the number of pins exceeds 60, it would be difficult to maintain the integrity or strength of the mold.

In the golf ball mold according to the invention, adjustable dimple-forming pins are preferably disposed both at the parting surface and in proximity to the poles of the mold. In the development process of golf balls, an optimum dimple shape is merely obtained as a result of a trial and error procedure. The positions where the dimple-forming pins are disposed are not particularly limited. In this sense, the dimple-forming pins may be disposed only at the parting surface or only in proximity to the poles of the mold or at another position. When dimple-forming pins are disposed at the parting surface and in proximity to the poles of the mold, the projection distances of the respective pins need not be equal.

In the golf ball according to the invention, the type of dimples is not limited to one, and two or more types of dimples may be present. Where two or more types of dimples are present, adjustable pins having corresponding two or more inner end shapes are used. The planar shape of dimples is not critical and various shapes are acceptable. Often, dimples of a circular planar shape are preferred, and the inner end shape of dimple-forming pins is configured in conformity therewith. The total number of dimples is usually 240 to 600, especially 340 to 450.

The dimple arrangement may be selected from well-known arrangements including regular octahedral, regular dodecahedral, and regular icosahedral arrangements. The pattern which is formed on the ball surface by arranging dimples includes various patterns such as square, hexagon, pentagon, and triangle patterns.

Insofar as the dimple design is finely adjusted as defined above using the mold according to the invention and the requirements of flight performance, symmetry and cost performance are met, the golf ball of the invention may have any desired structure. The invention is applicable to the manufacture of solid golf balls including one-piece golf balls, two-piece golf balls, and multi-piece golf balls of three or more layer structure as well as wound golf balls using molds. The molding method may be either injection molding or compression molding. Using the mold according to the invention, golf balls can be prepared from well-known stock materials by conventional methods.

Since the golf ball manufactured using the mold according to the invention have an optimum adjusted dimple arrangement and shape, especially an optimum adjusted dimple depth, the ball is drastically improved in flight performance and symmetry, minimized in performance variation at different impact points, and thus fully accommodates the diversified personal demand of individual golfers. According to the invention, several types of golf balls having dimples of different shapes can be manufactured with a common mold. It is unnecessary to manufacture a mold for each of a golf ball having dimples of a particular shape. Then cumbersome steps are eliminated, the development period can be shortened, the development cost can be reduced.

These permit golf balls to be manufactured at low cost. Golf balls of high cost performance are available.

The diameter and weight of the golf ball may be properly determined in accordance with the Rules of Golf.

The invention is not limited to the above-illustrated embodiment. For example, the number, arrangement and inner end shape of dimple-forming pins disposed in the mold may be altered as desired. Many modifications and variations may be made within the scope of the invention.

Experiment

Figure 5:
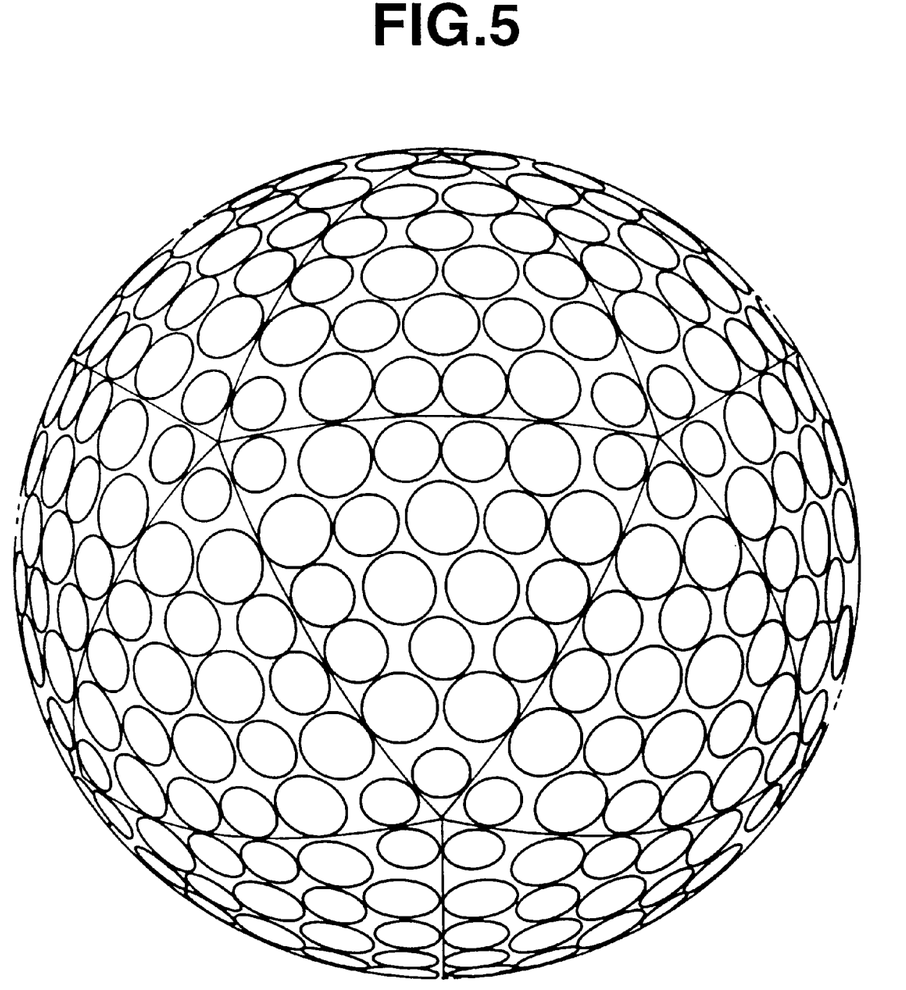
FIG. 5 illustrates a dimple arrangement pattern on a golf ball according to one embodiment of the invention.
Figure 6:
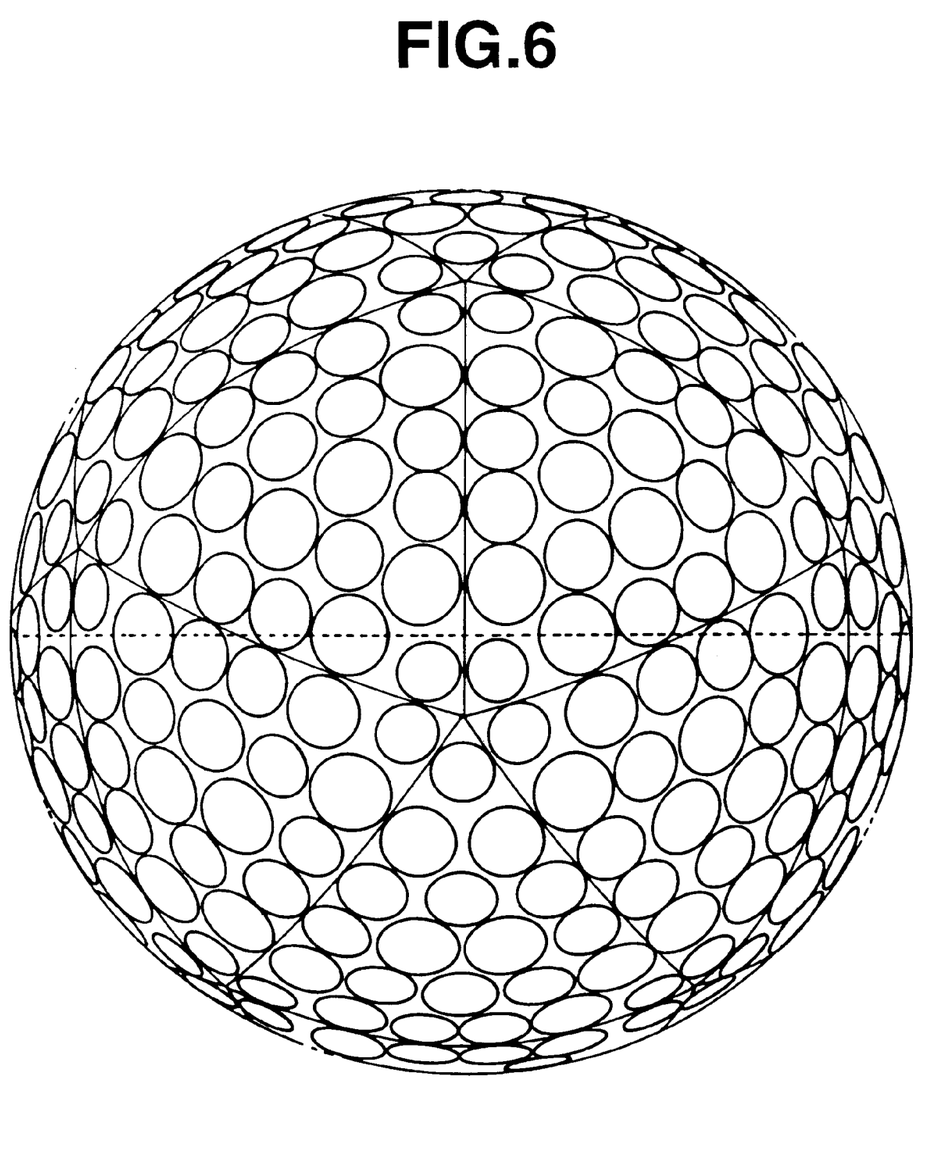
FIG. 6 illustrates the dimple arrangement pattern of FIG. 5 as viewed at a different angle.

Golf balls having dimples of three types A, B and C as shown in Table 1 formed in the surface in a total number of 420 were manufactured by molding a core from a well-known stock material by a conventional method, placing the core in a mold, and injection molding a cover stock on the core. The golf balls had an icosahedral arrangement of dimples which is shown in the plane view of FIG. 5 as viewed at the pole and in the plane view of FIG. 6 as viewed at the equator.

TABLE 1

|  | Diameter (mm) | Depth (mm) | Number |
| --- | --- | --- | --- |
| Dimple A | 3.8 | 0.19 | 180 |
| Dimple B | 3.3 | 0.18 | 180 |
| Dimple C | 3.0 | 0.17 | 60 |

Figure 7:
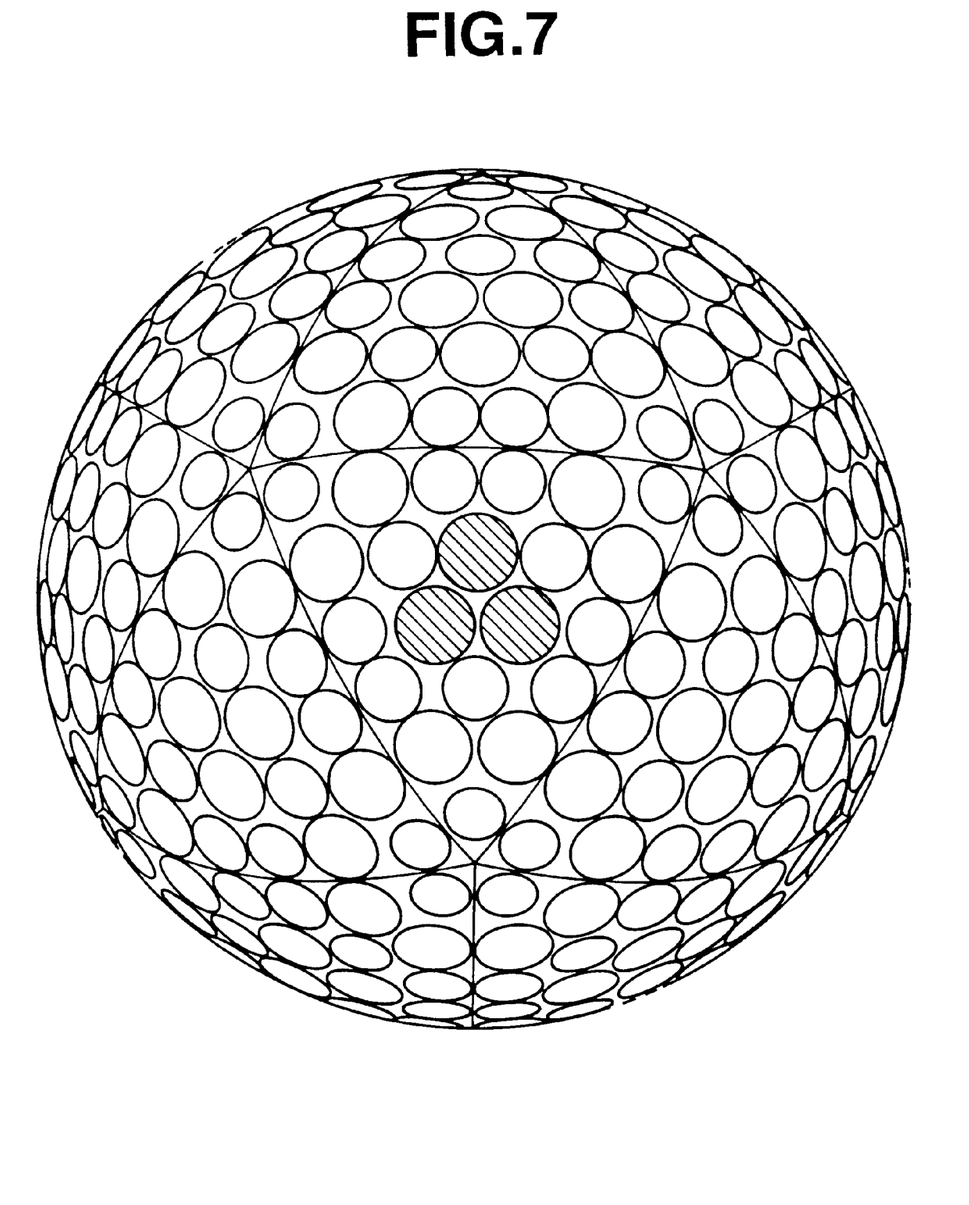
FIG. 7 illustrates the dimple arrangement pattern of FIG. 5 in which the positions of dimple-forming pins are depicted.
Figure 8:
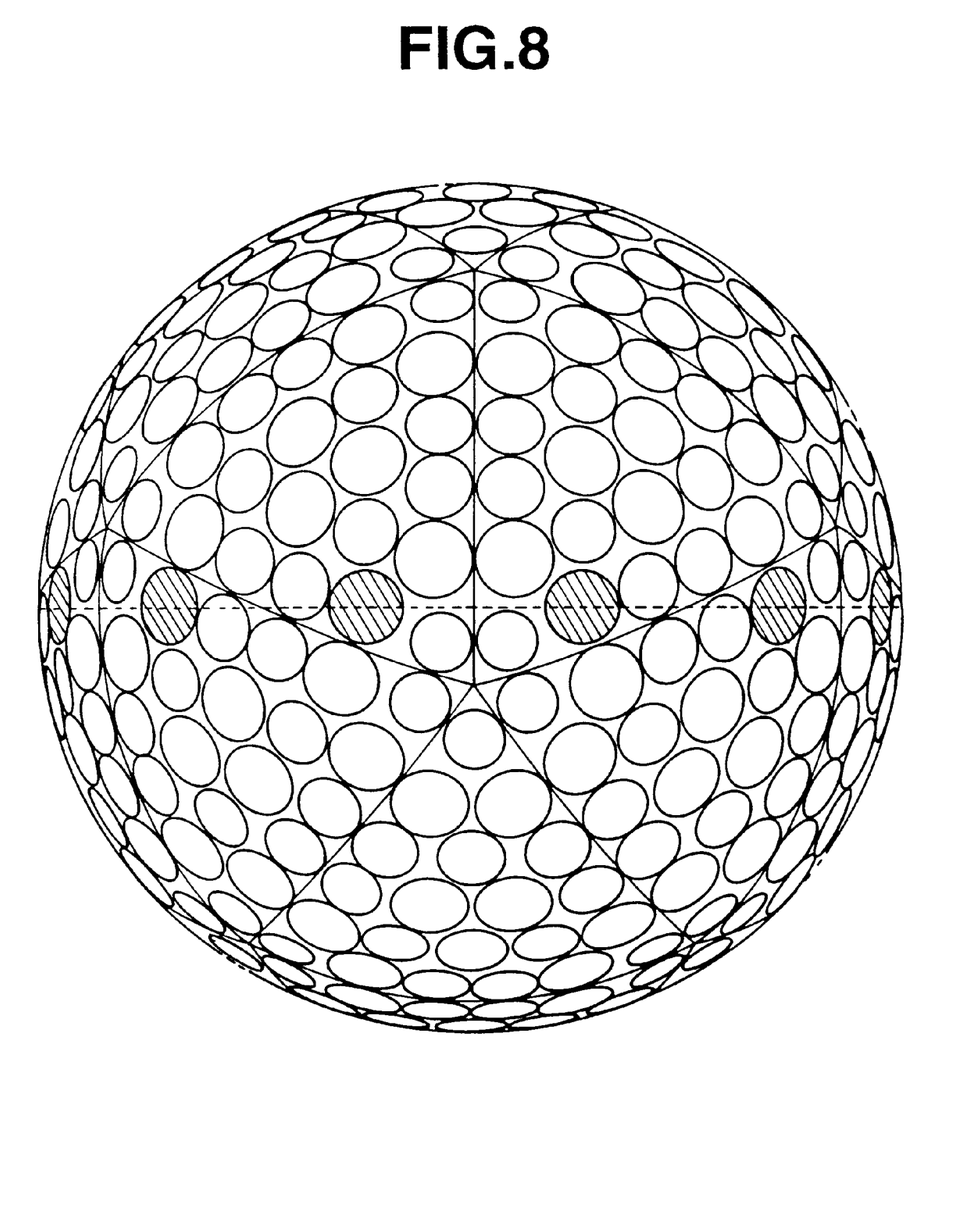
FIG. 8 illustrates the dimple arrangement pattern of FIG. 6 in which the positions of dimple-forming pins are depicted.

Among three types of dimples A, B, and C on the ball surface, some of the dimple-forming protrusions on the mold cavity surface for forming dimples A were constructed by dimple-forming pins whose projection distance from the cavity surface was adjustable. More particularly, among the dimple-forming protrusions for forming 180 dimples A, twelve (12) dimple-forming pins were disposed on the mold parting surface and six (6) dimple-forming pins were disposed in proximity of the mold poles. The positions at which the adjustable dimples or dimple-forming pins are shown in the plane view of FIG. 7 as viewed at the pole and in the plane view of FIG. 8 as viewed at the equator. Next, in the mold, the projection distance of dimple-forming pins, that is, the depth of dimples was changed as shown in Table 2 whereupon golf balls, Nos. 1 to 5, were manufactured. It is noted that No. 3 is a reference golf ball prior to the adjustment of dimple depth.

The golf balls were tested by means of a swing robot (manufactured by Miyamae K. K.) using a driver J's World Stage (manufactured by Bridgestone Sports Co., Ltd., loft 9.5°) as a club. The balls were repeatedly hit at a head speed of 45 m/sec. by pole hitting in the direction of arrow 20 in FIG. 9(A) and seam hitting in the direction of arrow 26 in FIG. 9(B). The total distance (expressed in meter) was measured. The results are shown in Table 2.

TABLE 2

|  | Dimple depth (mm) | | Total distance (m) | |
| --- | --- | --- | --- | --- |
|  | 6 dimples near pole | 12 dimples on parting surface | Pole hitting | Seam hitting |
| No. 1 | 0.190 | 0.205 | 224 | 224 |
| No. 2 | 0.200 | 0.215 | 227 | 226 |
| No. 3 | 0.190 | 0.190 | 225 | 222 |
| No. 4 | 0.190 | 0.193 | 225 | 222 |
| No. 5 | 0.185 | 0.190 | 224 | 222 |

It is evident from Table 2 that golf ball No. 3 is inferior in symmetry. Despite adjustment of the dimple depth, golf ball Nos. 4 and 5 are not improved in symmetry. In contrast, golf ball Nos. 1 and 2 are improved in symmetry owing to a proper adjustment of the dimple depth. Especially, golf ball No. 2 travels a lower trajectory and a longer distance.

According to the invention, several types of golf balls having dimples of different shapes can be manufactured with a common mold. Then golf balls of quality including symmetry and flight performance can be manufactured at low cost.

Although some preferred embodiments have been described, many modifications and variations may be made hereto in the light of the above teachings. It is therefore to be understood that within the scope of the appended claims, the invention may be practiced otherwise than as specifically described.

We claim:

1. A golf ball mold comprising; a pair of split mold sections which are removably mated to define a spherical cavity between their inner surfaces, the cavity surfaces being provided with a plurality of dimple-forming protrusions, wherein some of the plurality of dimple-forming protrusions are constructed by dimple-forming pins whose inner end has substantially the same shape as the protrusions, and said dimple-forming pins are movable along their axis so that the projection distance of the pins into the cavity is adjustable for improving golf ball symmetry; said dimple forming pins having a diameter in the range of 2.0 to 4.6 mm, and the number of said dimple forming pins in a pair of the mold sections is in the range of 2 to 50.

2. The golf ball mold of claim 1 wherein the dimple-forming pins are axially movable a distance of at least 0.005 mm.

3. The golf ball mold of claim 1 wherein the dimple-forming pins are disposed at the parting surface between the mold sections and in proximity to the opposed poles of the mold sections.

4. The golf ball mold of claim 1, wherein the number of dimple-forming pins in each of the mold sections is in the range of 10 to 30.

5. The golf ball mold of claim 1, wherein the dimple-forming pins are axially movable a distance in the range of 0.005 to 0.02 mm.

6. The golf ball mold of claim 1, wherein said dimple-forming pins have a projection distance into said spherical cavity in the range of 0.04 to 0.3 mm.

* * * * *